(12) United States Patent
Furuno et al.

(10) Patent No.: US 8,972,095 B2
(45) Date of Patent: Mar. 3, 2015

(54) AUTOMATIC GUIDED VEHICLE AND METHOD FOR DRIVE CONTROL OF THE SAME

(75) Inventors: Hideaki Furuno, Tokyo (JP); Yoshiharu Tomioka, Tokyo (JP); Yutaka Yoshida, Tokyo (JP)

(73) Assignee: Hitachi Ltd., Tokyo (JP)

( * ) Notice: Subject to any disclaimer, the term of this patent is extended or adjusted under 35 U.S.C. 154(b) by 262 days.

(21) Appl. No.: 13/152,315

(22) Filed: Jun. 3, 2011

(65) Prior Publication Data
US 2011/0301800 A1 Dec. 8, 2011

(30) Foreign Application Priority Data

Jun. 3, 2010 (JP) .................................. 2010-127658

(51) Int. Cl.
*G05D 1/02* (2006.01)
*G05D 3/10* (2006.01)

(52) U.S. Cl.
CPC .............. *G05D 1/024* (2013.01); *G05D 1/0274* (2013.01); *G05D 2201/0216* (2013.01)
USPC .................................. 701/25; 701/23; 701/50

(58) Field of Classification Search
CPC .......... G05D 1/024; G05D 2201/0216; G05D 1/0255; G05D 1/0272; G05D 1/0274; G05D 1/027; G05D 1/0242; G05D 1/0278
USPC .............. 701/23, 50, 409, 467, 514, 520, 532
See application file for complete search history.

(56) References Cited

U.S. PATENT DOCUMENTS

| | | | |
|---|---|---|---|
| 3,642,087 A | * | 2/1972 | Sampey ...................... 180/168 |
| 4,040,500 A | * | 8/1977 | Blakeslee ..................... 180/168 |
| 4,137,984 A | * | 2/1979 | Jennings et al. ............. 180/19.1 |
| 4,258,813 A | * | 3/1981 | Rubel ........................... 180/168 |

(Continued)

FOREIGN PATENT DOCUMENTS

| | | |
|---|---|---|
| JP | 62-022113 | 1/1987 |
| JP | 04-6966 | 1/1992 |

(Continued)

OTHER PUBLICATIONS

Notification of Reasons for Refusal dated Oct. 8, 2013 for Application No. 2010-127658 and Translation.

*Primary Examiner* — Calvin Cheung
*Assistant Examiner* — Courtney Heinle
(74) *Attorney, Agent, or Firm* — Antonelli, Terry, Stout & Kraus, LLP.

(57) ABSTRACT

An automatic guided vehicle and a method for drive control enable driving of the vehicle with a coordinate system, while using designation of a movement position by address. The automatic guided vehicle measures a surrounding state by a laser, performs matching between map data and measurement data obtained by the measuring to obtain the current position, and runs, following preset route data, based on the obtained current position. The vehicle includes a data memory that stores correspondence information between addresses of certain positions in a drive area where the vehicle runs and coordinates that are set in the drive area, and a processing section that, when a movement target position is designated by address from a host computer, transforms the designated address into coordinates, based on the correspondence information between addresses and coordinates, and drives the vehicle, following the route data to the coordinates corresponding to the address.

10 Claims, 14 Drawing Sheets

(56) References Cited

U.S. PATENT DOCUMENTS

| | | | | |
|---|---|---|---|---|
| 4,309,758 A * | 1/1982 | Halsall et al. | | 701/23 |
| 4,328,545 A * | 5/1982 | Halsall et al. | | 701/23 |
| 4,345,662 A * | 8/1982 | Deplante | | 180/168 |
| 4,858,132 A * | 8/1989 | Holmquist | | 701/28 |
| 5,019,983 A * | 5/1991 | Schutten et al. | | 701/50 |
| 5,202,832 A * | 4/1993 | Lisy | | 701/24 |
| 5,525,884 A * | 6/1996 | Sugiura et al. | | 318/587 |
| 5,828,968 A * | 10/1998 | Iiboshi et al. | | 701/23 |
| 5,925,080 A * | 7/1999 | Shimbara et al. | | 701/23 |
| 6,049,745 A * | 4/2000 | Douglas et al. | | 701/23 |
| 6,092,010 A * | 7/2000 | Alofs et al. | | 701/23 |
| 6,654,647 B1 * | 11/2003 | Kal | | 700/9 |
| 8,301,374 B2 * | 10/2012 | Surampudi et al. | | 701/438 |
| 2003/0080901 A1 * | 5/2003 | Piotrowski | | 342/386 |
| 2004/0167688 A1 * | 8/2004 | Karlsson et al. | | 701/23 |
| 2005/0267631 A1 * | 12/2005 | Lee et al. | | 700/245 |
| 2006/0167600 A1 * | 7/2006 | Nelson et al. | | 701/23 |
| 2007/0100498 A1 * | 5/2007 | Matsumoto et al. | | 700/245 |
| 2007/0219667 A1 * | 9/2007 | Jung et al. | | 700/245 |
| 2008/0039991 A1 * | 2/2008 | May et al. | | 701/25 |
| 2009/0043440 A1 * | 2/2009 | Matsukawa et al. | | 701/25 |
| 2009/0138151 A1 * | 5/2009 | Smid et al. | | 701/27 |
| 2009/0222159 A1 * | 9/2009 | Bauer | | 701/23 |
| 2009/0254235 A1 * | 10/2009 | Kuroda | | 701/23 |
| 2010/0049391 A1 * | 2/2010 | Nakano | | 701/23 |
| 2010/0114416 A1 * | 5/2010 | Au et al. | | 701/23 |
| 2010/0152943 A1 * | 6/2010 | Matthews | | 701/25 |
| 2010/0164701 A1 * | 7/2010 | Bargman et al. | | 340/436 |
| 2011/0098874 A1 * | 4/2011 | Choi et al. | | 701/26 |
| 2011/0153137 A1 * | 6/2011 | Yeom | | 701/25 |
| 2011/0178669 A1 * | 7/2011 | Tanaka et al. | | 701/25 |
| 2011/0218670 A1 * | 9/2011 | Bell et al. | | 700/215 |
| 2012/0035797 A1 * | 2/2012 | Oobayashi et al. | | 701/23 |
| 2012/0046820 A1 * | 2/2012 | Allard et al. | | 701/25 |
| 2012/0083960 A1 * | 4/2012 | Zhu et al. | | 701/23 |
| 2012/0310466 A1 * | 12/2012 | Fairfield et al. | | 701/28 |
| 2012/0330492 A1 * | 12/2012 | Douglas et al. | | 701/23 |

FOREIGN PATENT DOCUMENTS

| | | |
|---|---|---|
| JP | 06-119043 | 4/1994 |
| JP | 2001-350520 | 12/2001 |
| JP | 2005-339582 | 12/2005 |
| JP | 3749323 | 2/2006 |
| JP | 2007-122304 | 5/2007 |
| JP | 2007-213356 | 8/2007 |
| JP | 2010-061484 | 3/2010 |

* cited by examiner

ROUTE DATA CREATION

FIG. 11   A DRIVE CONTROL

COMPARISON EXAMPLE

AUTOMATIC GUIDED VEHICLE AND METHOD FOR DRIVE CONTROL OF THE SAME

CROSS REFERENCE TO RELATED APPLICATION

The application claims the foreign priority benefit under Title 35, United States Code, Section 119(a)-(d) of Japanese Patent Application No. 2010-127658 filed on Jun. 3, 2010 the contents of which are hereby incorporated by reference.

BACKGROUND OF THE INVENTION

1. Field of the Invention

The present invention relates to a technology for an automatic guided vehicle and a method for drive control of the same.

2. Description of the Related Art

In a production line of a factory or a warehouse, an automatic guided vehicle (AGV) that is made automatically run on a target drive route and loads and unloads cargos by automatic control is introduced to save labor and improve the accuracy of carriage. As methods for guiding such an automatic guided vehicle on a target drive route, various methods have been developed and applied.

For example, in an electromagnetic induction method, an induction magnetic field transmitted from an electric cable buried under a floor is detected by a coil mounted on an automatic guided vehicle; the drive velocity control and the steering control of the automatic guided vehicle are performed; and a drive following a target drive route is performed. For another example, in an optical method, a reflected light from a reflecting tape stuck on a floor is detected by an optical sensor mounted on an automatic guided vehicle; the drive velocity control and the steering control of the automatic guided vehicle are performed; and a drive following a target drive route is performed (For example, refer to Patent document 1, namely JP H04-006966 B2).

Further, in a magnetic induction method, the magnetism of a permanent magnet buried in a floor or a magnetic tape stuck on a floor surface is detected by a magnetic detection sensor mounted on an automatic guided vehicle; the drive velocity control and the steering control of the automatic guided vehicle are performed; and a drive following a target drive route is performed (For example, refer to Patent Document 2, namely JP 2005-339582 A).

Further, in a gyro method, detection is performed by a gyro sensor mounted on an automatic guided vehicle, and a reference position marker for position correction buried under a floor is detected by a sensor mounted on the automatic guided vehicle; the drive velocity control and the steering control of the automatic guided vehicle are performed; and a drive following a target drive route is performed (For example, refer to Patent Document 3, namely JP 2001-350520 A).

As another example, there is a laser method in which a reflecting plate for reflecting a laser light projected from an automatic guided vehicle is fitted on a wall, post, equipment, or the like in the periphery of a drive route; a reflected light of the laser light projected from the automatic guided vehicle is detected by a detection sensor for a laser reflection light mounted on the automatic guided vehicle; a position is identified by a computation process, such as a triangulation method, based on the light receiving angle of the reflected light; the drive velocity control and the steering control of the automatic guided vehicle are performed; and a drive following a target drive route is performed.

In the technologies described in Patent Documents 1 to 3, a movement target is designated by an address that is at a certain position in a drive area where an automatic guided vehicle runs; the automatic guided vehicle is driven to the address; and thus drive control is performed.

On the other hand, Patent Document 4, namely JP 4375320 B2 discloses a mobile robot that autonomously moves on a route by performing matching between measurement data that is collected by a laser distance sensor and map data that is set in advance and computing the current position.

However, in any of the above-described methods, arrangement is made such that a target drive route is fixed, and the drive direction is determined, corresponding to a deviation amount of a sensor. Further, in these methods, in general, a safety sensor is mounted on an automatic guided vehicle independently from a drive sensor; an obstacle or a person is recognized in a in a fixed area; and, as a result, when there is a problem with driving the automatic guided vehicle, the automatic guided vehicle is decelerated or stopped.

In the technologies described in Patent Documents 1 to 3, an automatic guided vehicle runs, following a drive route arranged in terms of hardware, with an electric cable, a reflecting tape, or the like, and stops by detecting the address of a movement target, which only enables driving with a low degree of freedom.

In the technology described in Patent Document 4, because a route is in general managed with coordinates, a drive control by an address, which has been used on a drive route as hardware, cannot be applied. That is, the technologies described in Patent Documents 1 to 3 and the technology described in Patent Document 4 are not compatible with each other.

Accordingly, when it is attempted to drive an automatic guided vehicle by the technology disclosed by Patent Document 4 in a system that has used the technology disclosed by any of Patent Documents 1 to 3, it is necessary to modify the entire system, which makes it difficult to introduce a self-driving automatic guided vehicle as one described in Patent Document 4.

The present invention has been developed in the above-described background, and an object of the invention is to provide an automatic guided vehicle and a method for drive control that enable driving based on a coordinate system while using designation of a movement target position by an address.

SUMMARY OF THE INVENTION

In order to solve the above-described problems, according to the invention, an automatic guided vehicle measures a surrounding state by a sensor capable of measuring a distance to an object, performs matching between map data and measurement data obtained by the measuring to obtain a current position, and runs, following preset route data, based on the obtained current position, and the automatic guided vehicle includes: a storage section that stores correspondence information between addresses of certain positions in a drive area where the automatic guided vehicle runs and coordinates that are set in the drive area; and a control section that, when a movement target position is designated with one of the addresses from an external device, transfers the designated address into coordinates, based on the correspondence information between addresses and coordinates, and drives the automatic guided vehicle to coordinates that correspond to the address, following the route data.

Other solutions will be described in later-described embodiments, as appropriate.

DETAILED DESCRIPTION OF THE PREFERRED EMBODIMENTS

Figure 1:
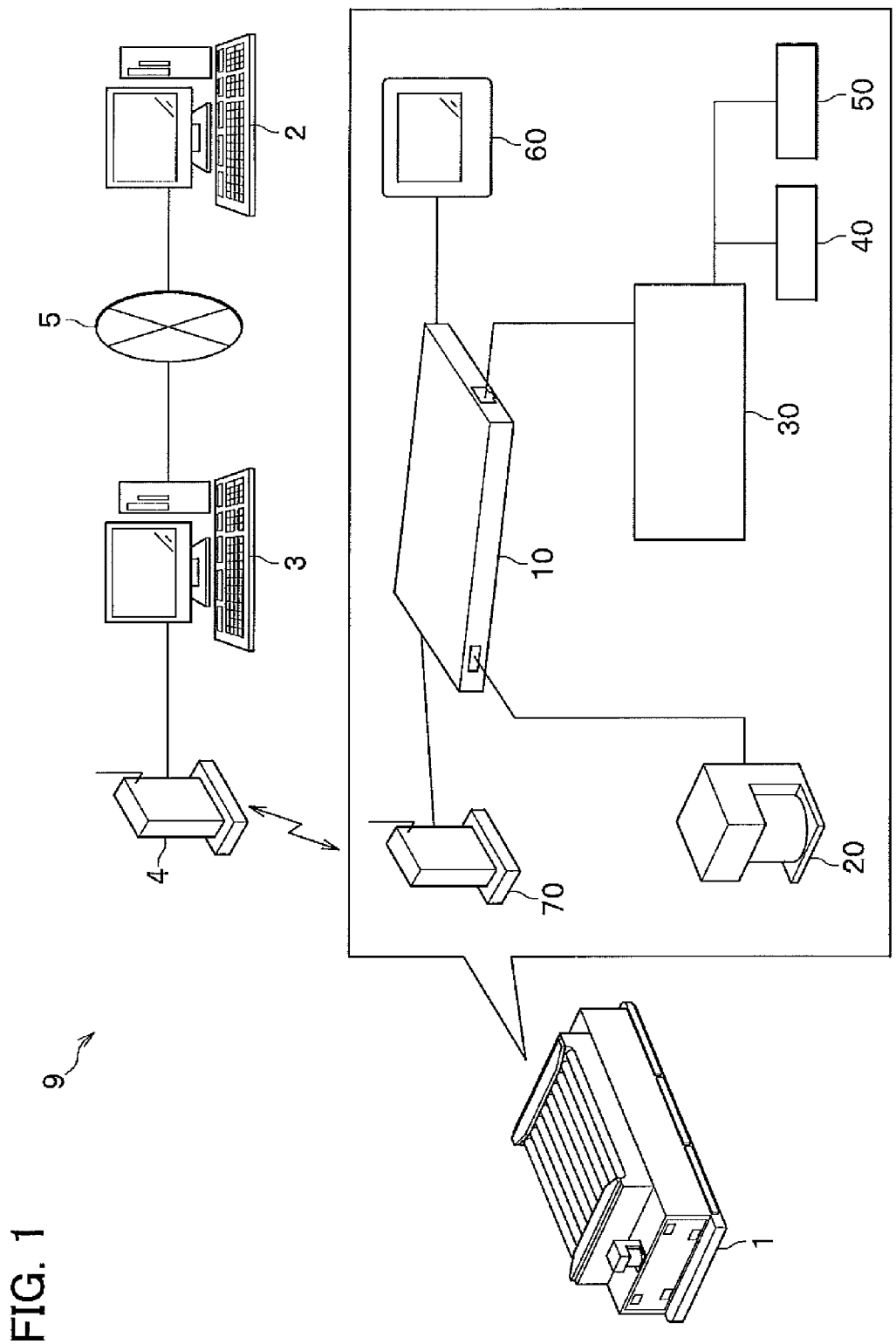
FIG. 1 a diagram showing an example of a configuration of an automatic conveying system according to a first embodiment.

Modes for carrying out the present invention (referred to as 'embodiments') will be described below in detail, referring to the drawings, as appropriate. The same reference symbols will be assigned to the similar elements in configuration in respective figures, and description of these will be omitted.

First Embodiment

First, a first embodiment according to the present invention will be described, referring to FIGS. 1 to 16.
System Configuration
FIG. 1 is a diagram showing an example of a configuration of an automatic conveying system according to the first embodiment.

An automatic conveying system 9 includes an automatic guided vehicle 1, a host computer (an external device) 2, and an operation management computer (an external device) 3. Further, an upper-level host may be arranged on the host computer 2 (not shown).

The automatic guided vehicle 1 moves in a drive area, following route data 123 (FIG. 2), loads a cargo, moves, and unloads the cargo, for example.

The host computer 2 is connected with the operation management computer 3 via a network 5, such as a LAN (local area network), and has functions, such as creating map data 122 from measurement data 121 (FIG. 2) transmitted from the automatic guided vehicle 1, and the like, similarly to the operation management computer 3, and creating route data 123 by a user.

The operation management computer 3 has functions, such as creating map data 122 from the measurement data 121 (FIG. 2) transmitted from the automatic guided vehicle 1 and the like, similarly to the host computer 2, transmitting an instruction to the automatic guided vehicle 1 by a wireless LAN via a radio master station 4, and receiving a status report from the automatic guided vehicle 1.

The automatic guided vehicle 1 includes a controller 10, a laser distance sensor 20, a programmable controller 30, a steered wheel 40, running wheels 50, a touch panel display 60, and a radio slave station 70.

The controller 10 is a device that controls the operation of the automatic guided vehicle 1. The controller 10 will be described later in detail, referring to FIG. 2.

The laser distance sensor 20 is a sensor that can measure the distance to an object, projects a laser light, a millimeter wave, or the like, and measures the distance to an obstacle by detecting a reflected light. The laser distance sensor 20 is fitted at a position on the automatic guided vehicle 1, enabling measurement in an angle greater than or equal to 180 degrees, rotatable in a range greater than or equal to 180 degrees, and thereby capable of projecting a laser light at each predetermined angle.

The programmable controller 30 is a device that performs control of the steered wheel 40 controlled with the steering angle as a parameter and the running wheels 50 controlled with the velocity as a parameter.

The touch panel display 60 is an information input/output device for performing various settings and maintenance of the automatic guided vehicle 1.

The radio slave station 70 is a device that receives a communication message transmitted from the radio master station 4 and delivers the message to the controller 10.

Configuration of Controller

A configuration of a controller will be described below, based on FIG. 2 and referring to FIG. 1.

Figure 2:
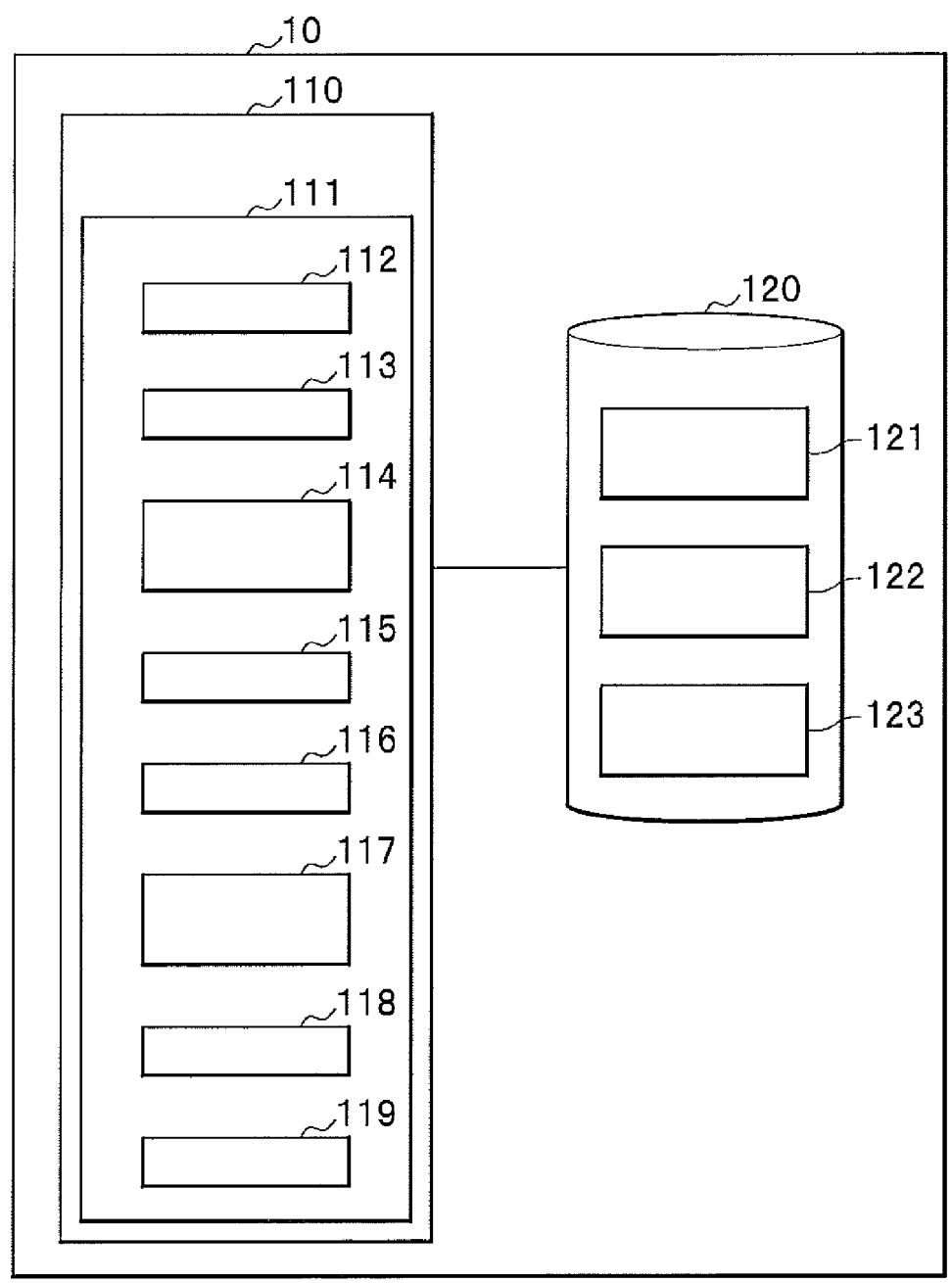
FIG. 2 is a block diagram showing an example of a configuration of a controller in an automatic guided vehicle according to the first embodiment.

FIG. 2 is a block diagram showing an example of a configuration of a controller in the automatic guided vehicle according to the first embodiment.

The controller 10 includes a program memory 110, such as a ROM (read only memory), a data memory (storage section) 120, such as a RAM (random access memory), and a CPU (central processing unit), not shown.

The data memory 120 stores the measurement data 121, the map data 122, and the route data 123.

The measurement data 121 is data related to the distances to obstacles measured by the laser distance sensor 20.

The map data 122 is map information that has been created as a result of recognition processing, based on the measurement data 121, by the host computer 2, the operation management computer 3, or a personal computer, not shown, for creating map data and then transmitted, and is map information on the drive area where the automatic guided vehicle 1 runs. The map data 122 will be described later.

The route data 123 is route information with which driving of the automatic guided vehicle 1 is scheduled, and is created on the map data 122. Similarly to the map data 122, the route data 123 is created by a user with editing software executed on the host computer or the like with reference to the map data 122. The route data 123 is transmitted from the host computer 2, the operation management computer 3, or the personal computer, not shown, for creating map data to the automatic guided vehicle 1 and then stored in the data memory 120. The route data 123 includes, for example, information on the velocity of the automatic guided vehicle 1 at respective positions. The route data 123 will be described later.

The program memory 110 stores programs for control of the automatic guided vehicle 1. By executing these programs, a processing section (control section) 111 for processing information is implemented. The processing section 111 includes a coordinate transformation section 112, a data obtaining section 113, a measurement data obtaining section 114, a matching section 115, a position estimating section 116, a drive route determining section 117, a drive control section 118, and a stoppage control section 119.

The coordinate transformation section 112 has a function to transform a target address included in an task instruction obtained from the host computer 2 into coordinates defined by the map data 122 (in other words, coordinates that are set in the drive area). Herein, an address represents a certain position in the drive area where the automatic guided vehicle 1 runs.

The data obtaining section 113 has a function to obtain various data, such as the route data 123 and the map data 122, from the data memory 120.

The measurement data obtaining section 114 has a function to obtain the measurement data 121, which has been collected by the laser distance sensor 20, during manual operation by a remote controller or drive control of the automatic guided vehicle 1.

The matching section 115 has a function to perform matching between the measured data 121 transmitted from the laser distance sensor 20 during drive control of the automatic guided vehicle 1 and the map data 122.

The position estimating section 116 has a function to estimate the current position of the automatic guided vehicle 1, based on a result of matching by the matching section 115.

The drive route determining section 117 has a function to determine the next movement target position on a route, based on the velocity information on the automatic guided vehicle 1 included in the route data 123 and the current position estimated by the position estimating section 116. Further, the drive route determining section 117 also has a function to compute the steering angle from the deviation of the automatic guided vehicle 1 from the route.

The drive control section 118 has a function to instruct velocity information included in the route data 123 or a steering angle computed by the drive route determining section 117 to the programmable controller 30.

The stoppage control section 119 has functions to determine whether or not the automatic guided vehicle 1 has arrived at a target address, and stop the automatic guided vehicle 1 if it has arrived at the target address.

In order to drive the automatic guided vehicle 1, it is necessary to create and store the map data 122 and the route data 123 before setting the automatic guided vehicle 1 online (automatic driving). The procedure of creating the map data 122 and the route data 123 will be described below, based on FIGS. 3 to 9 and referring to FIGS. 1 and 2.

Process for Creating Map Data

Figure 3:
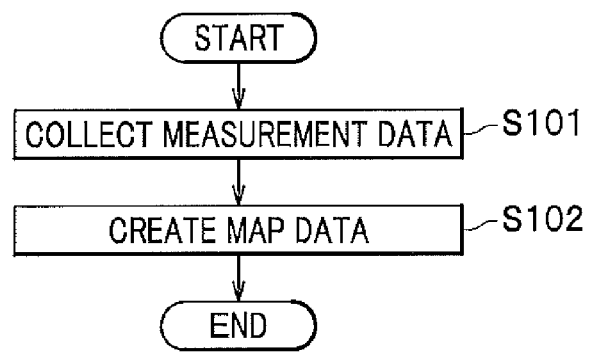
FIG. 3 is a flowchart showing a procedure of a process for creating map data.
Figure 4:
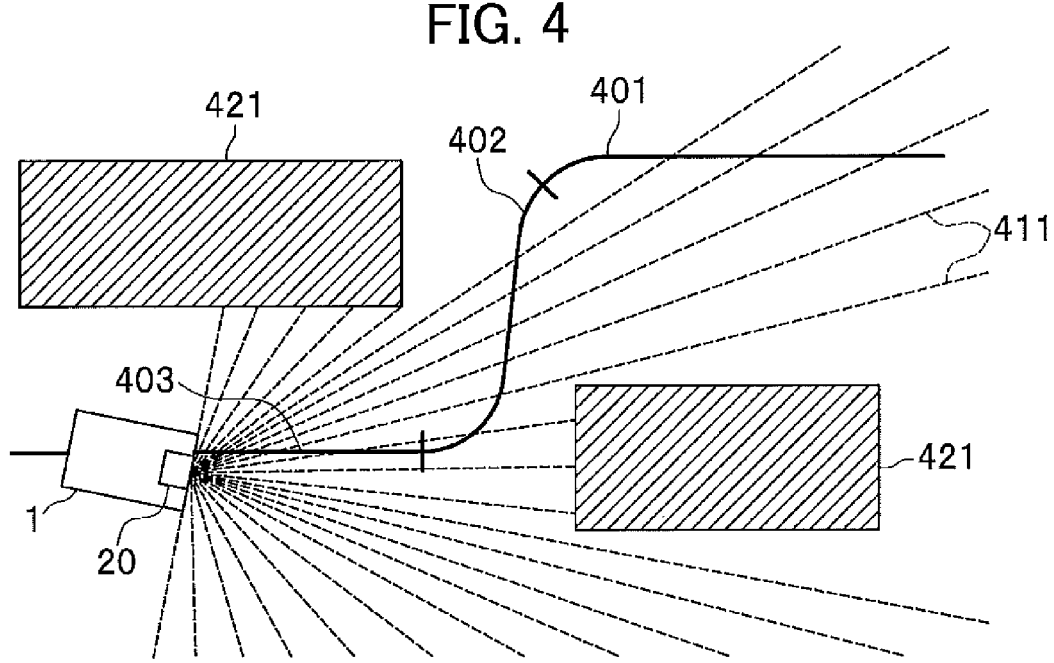
FIG. 4 is a diagram showing a method for collecting measurement data.

FIG. 3 is a flowchart showing a procedure of a process for creating map data. FIG. 4 is a diagram showing a method for collecting measurement data.

First, a user drives the automatic guided vehicle 1 at a low velocity with a manual controller, a remote controller, or the like, and the laser distance sensor 20 collects measurement data 121 (S101).

Herein, as show in FIG. 4, the laser distance sensor 20 rotates a laser projecting section, not shown, for example, 0.5 degrees by 0.5 degrees and totally by 180 degrees (or more than 180 degrees), while the laser projecting section projecting a laser light 411 with a period of 30 ms. This means that measurement is performed for an angle of 180 degrees each time the automatic guided vehicle 1 moves 1 to 10 cm. The laser distance sensor 20 receives a reflected light of the projected laser light 411, and a distance to an obstacle 421 is computed, based on the time from when the laser light 411 is projected until when the reflected light is received. The measurement data obtaining section 114 stores data related to the calculated distances to the obstacles as the measurement data 121 in the data memory 120. Incidentally, the measurement data 121 is collected with a constant interval of time. Reference symbols 401 to 403 will be described later.

After all the measurement data 121 in the area are collected, the measurement data 121 is output via an external interface, not shown, or the like, to the host computer 2, the operation management computer 3, or the personal computer, not shown, for creating map data.

Then, the user operates the software for creating a map that is operating on the host computer 2, the operation management computer 3, or the personal computer, not shown, for creating map data, and the map data 122 based on the measurement data 121 having been output is thereby created (S102 in FIG. 3). Concretely, the respective collected measurement data 121 are superimposed to create the map data 122.

The created map data 122 is transmitted via the external interface, not shown, or the like, to the automatic guided vehicle 1, and stored in the data memory 120.

Incidentally, the map data 122, which has been created once, is not updated unless the process in steps S101 to S102 is again performed.

Example of Map Data

Figure 5:
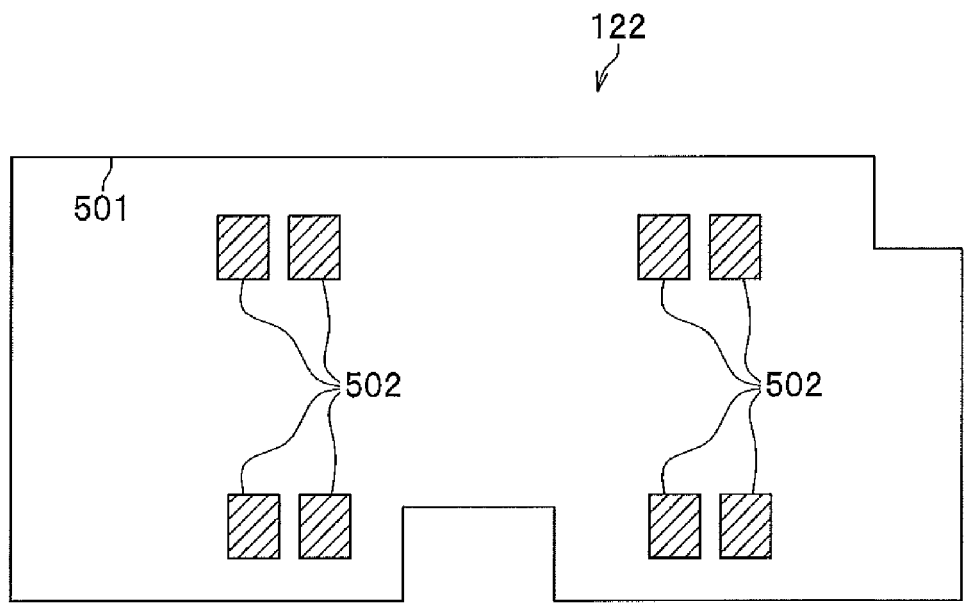
FIG. 5 is a diagram showing an example of map data.

FIG. 5 is a diagram showing an example of map data.

As shown in FIG. 5, in the map data 122, walls 501 and obstacles 502 in the drive area are recorded as data.

Process for Creating Route Data

A process for creating route data that represents a route on which the automatic guided vehicle 1 is to run will be described below, referring to FIGS. 6 to 9.

Figure 6:
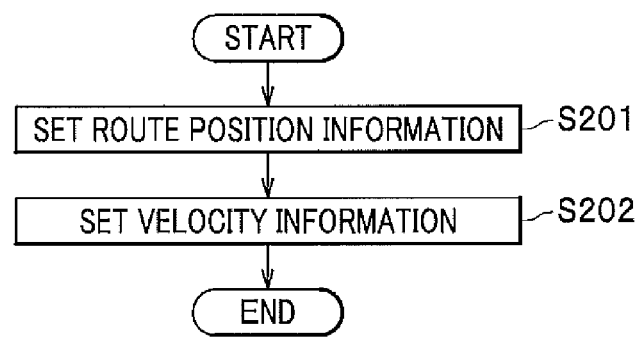
FIG. 6 is a flowchart showing a procedure of a process for creating route data.

FIG. 6 is a flowchart that shows the procedure of the process for creating route data.

First, using route creation software executed on the host computer 2, the operation management computer 3, or the personal computer, not shown, for creating map data, the user sets route position information by designating a route on the map data 122 (S201). The route creation software has a function to enable a user to easily create a route on a map by dragging with a pointing device, such as a mouse, on a displayed map screen, referring to the map data by the route creation software. The route position information created in such a manner is data expressed by a sequence of coordinates which are defined in the map data 122. Further, in setting the route position information, the user sets correspondence information between addresses and the coordinates in the route data 123 by setting the addresses.

Then, the user sets velocity information that designates velocities when the automatic guided vehicle 1 runs on the route created with the route creation software (S202). For example, describing with reference to FIG. 4, the velocity information is set such that the automatic guided vehicle 1 runs at the second velocity (1.2 [km/h]) in the first section 403, at the first velocity (0.6 [km/h]) in the subsequent curved section 402, and at the third velocity (2.4 [km/h]) in the section 401 after the curve.

Velocity setting can be performed in several steps in an order, such as the creep velocity (fine low velocity), the first velocity, the second velocity, etc. For example, ten divided velocities may be determined with the maximum velocity of 9 km/hr (150 m/min). However, the creep velocity is to be determined as a velocity lower than the first velocity (for example, 0.3 km/hr).

Example of Route Data

An example of route data 123 will be described below, referring to FIGS. 7 and 8.

Figure 7:
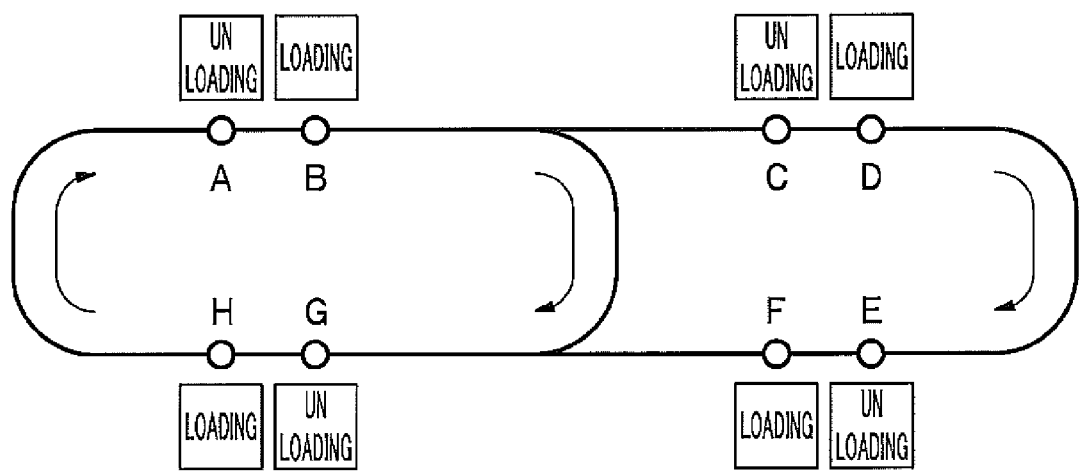
FIG. 7 is a diagram showing an example of a route.

FIG. 7 is a diagram showing an example of a route.

FIG. 7 shows an example of a route in a drive area of the automatic guided vehicle 1 in a factory. Symbols A to H represents addresses A to H.

In FIG. 7, address A, address C, address E, and address G represent positions where 'unloading task' is performed. Address B, address D, address F, and address H represent positions where 'loading task' is performed.

Incidentally, designation of addresses is a legacy inheritance from conventional systems.

Figure 8A:
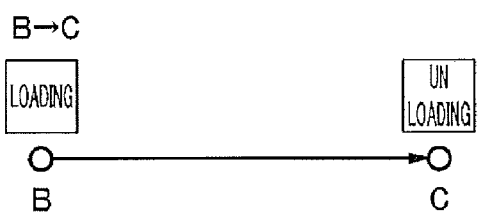
FIGS. 8A to 8C are diagrams showing an example of route data.
Figure 8B:
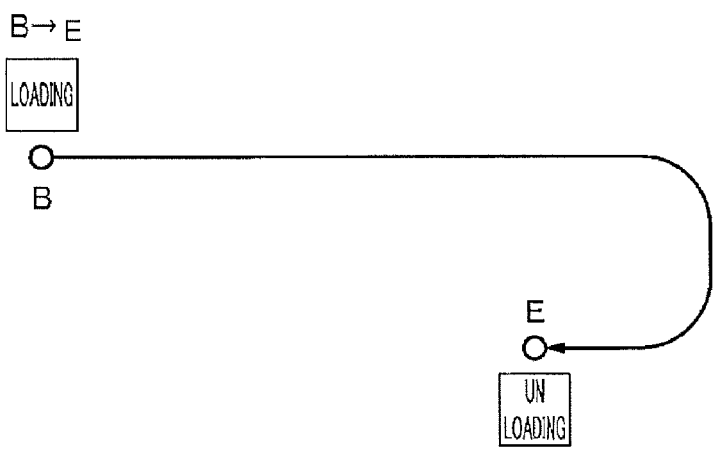
Figure 8C:
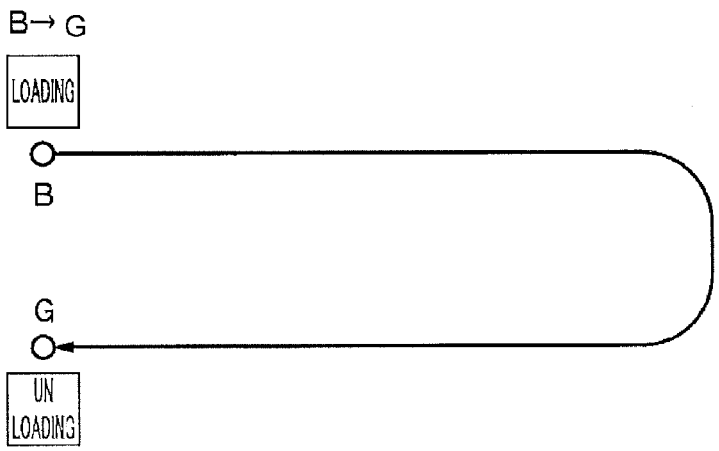

FIGS. 8A to 8C show examples of route data.

In FIGS. 8A to 8C, symbols B, C, E and G correspond to symbols B, C, E, and G in FIG. 7.

FIG. 8A shows a route for loading a cargo at address B and unloading the cargo at address C (B→C).

Likewise, FIG. 8B shows a route for loading a cargo at address B and unloading the cargo at address E (B→E), and FIG. 8C shows a route for loading a cargo at address B and unloading the cargo at address G (B→G).

In such a manner, route data 123 can be designated by 'a loading position→an unloading position' or 'an unloading position→a loading position'.

In the example in FIG. 7, settable route data 123 is, for example, as follows.

(1) unloading→loading
A→B, A→D, A→F, A→H
C→B, C→D, C→F, C→H
E→B, E→D, E→F, E→H
G→B, G→D, G→F, G→H (2) loading→unloading
B→A, B→C, B→E, B→G
D→A, D→C, D→E, D→G
F→A, F→C, F→E, F→G
H→A, H→C, H→E, H→G Based on the measurement data 121 collected by a single automatic guided vehicle 1, the map data 122 and the route data 123 are created by the host computer 2, operation management computer 3, or the personal computer, not shown, for creating map data, and are applied to every automatic guided vehicle 1 that is used.

Incidentally, map data 122 and route data 123 can also be individually created for one by one of all automatic guided vehicles 1 that are set online. This is effective in a case that individual differences in a laser distance sensor 20 and a drive system (steered wheel 40, running wheels 50) are so significant that map data 122 collected by a single automatic guided vehicle 1 can hardly be applied to all automatic guided vehicles 1.

Figure 9:
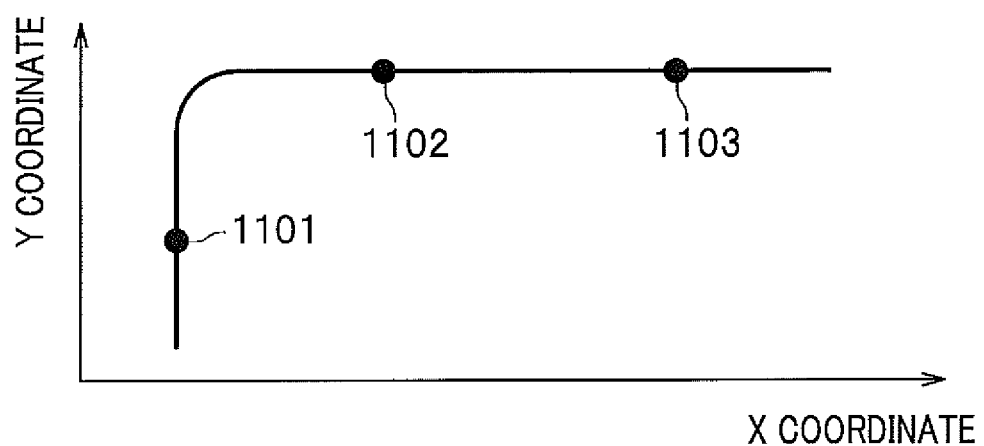
FIG. 9 is a diagram showing an example of correspondence information between a route and coordinates according to the first embodiment.

FIG. 9 is a diagram showing an example of correspondence information between the route and coordinates according to the first embodiment.

As shown in FIG. 9, for the route data 123, the route is managed with coordinates. Concretely, the route data 123 is expressed by a sequence of coordinates. Data that associates the addresses 1101 to 1103 with coordinates is also stored for the route data 123. Incidentally, the addresses 1101 to 1103 correspond to the addresses A to H in FIGS. 7 and 8.

Control Process during Driving

Processing in driving the automatic guided vehicle 1 will be described below, based on FIGS. 10 and 11 and referring to FIGS. 1 and 2.

Figure 10:
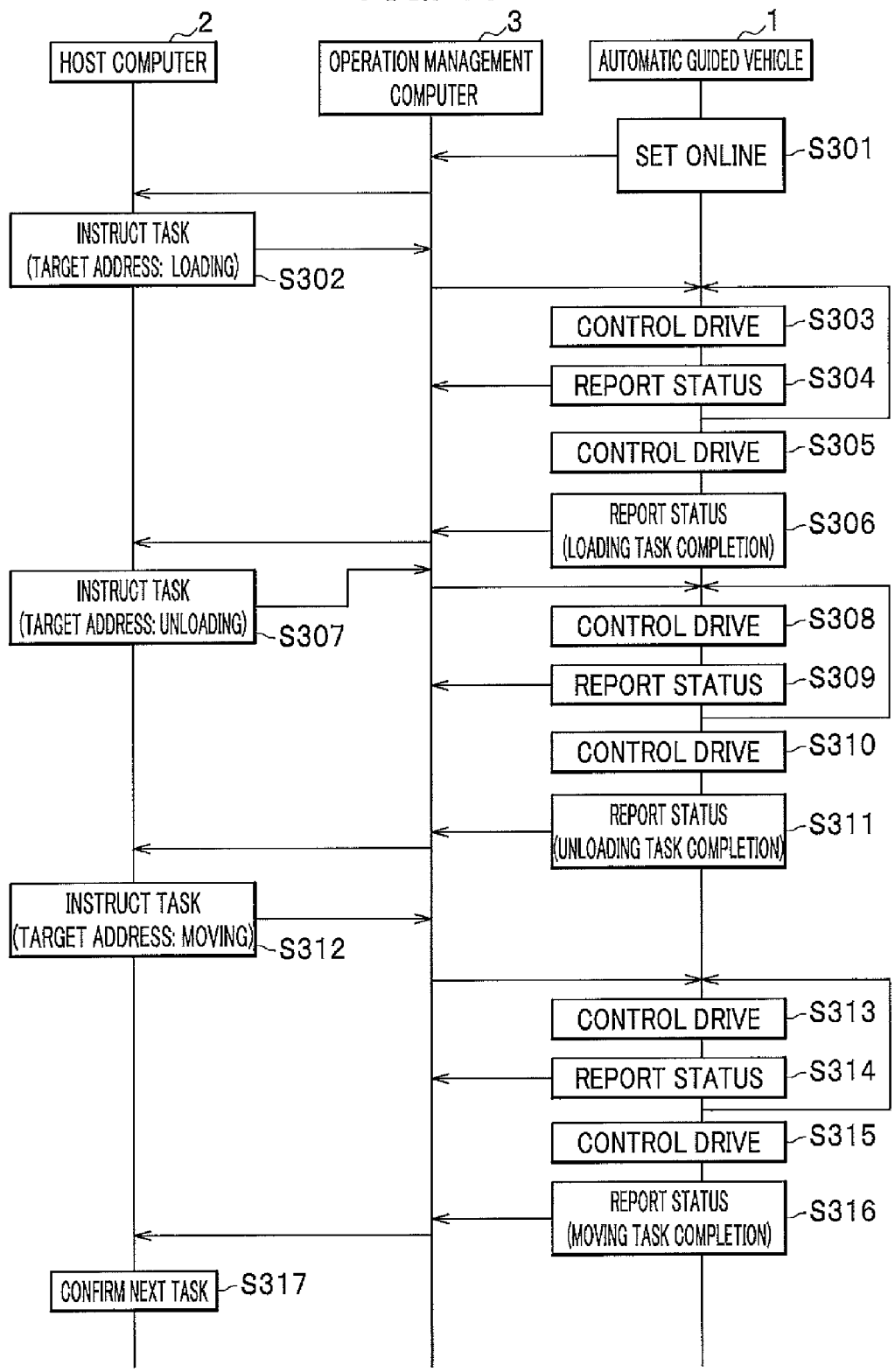
FIG. 10 is a sequence diagram showing a procedure of a process during driving the automatic guided vehicle according to the first embodiment.

FIG. 10 is a sequence diagram showing the procedure of a process in driving the automatic guided vehicle according to the first embodiment.

In setting an automatic guided vehicle 1 online, the user first moves the automatic guided vehicle 1 to a certain address, and inputs the current address via, for example, a touch panel display 60.

The automatic guided vehicle 1 thereby transmits information notifying that the automatic guided vehicle 1 has been set online to the host computer 2 (S301). Herein, the setting online also acts as an inquiry as to the next task.

The host computer 2 having received, via the operation management computer 3 from the automatic guided vehicle 1, the information (a current position and a status of the automatic guided vehicle 1) that also acts as an inquiry as to the next task transmits an instruction for a task to the automatic guided vehicle 1 (S302). In this instruction for a task, information on a target address and the content of a task to be performed at the target address is stored (A loading task is performed in the example of step S302).

The automatic guided vehicle 1 having received, via the operation management computer 3, the instruction for a task performs a drive control, which will be later described with reference to FIG. 11 (S303), and reports a current status (information on address passing, information on task completion, etc.) to the operation management computer 3 (S304).

The automatic guided vehicle 1 repeats the process in step S303 and step S304 until the automatic guided vehicle 1 arrives at the target address.

Then, subsequently to the drive control (S305), when the automatic guided vehicle 1 has arrived at the target address and completed the task (herein a loading task), the automatic guided vehicle 1 transmits a status report notifying that the loading task has been completed, to the operation management computer 3 (S306).

The operation management computer 3 having received the status report notifying that the loading task has been completed transmits a similar status report to the host computer 2.

Then, the host computer 2 transmits, via the operation management computer 3, an instruction for an unloading task as the next task to the automatic guided vehicle 1 (S307). In this task instruction, information on a target address and the content of the task are stored (an unloading task in the example in step S307).

The automatic guided vehicle 1 having received the task instruction via the operation management computer 3 performs drive control, which will be described later referring to FIG. 11 (S308), and reports the current status (information on address passing, information on task completion, etc.) to the operation management computer 3 (S309).

The automatic guided vehicle 1 repeats the process in step S308 and step S309 until the automatic guided vehicle 1 arrives at the target address.

Then, subsequently to the drive control (S310), when the automatic guided vehicle 1 has arrived at the target address and completed the task (herein an unloading task), the automatic guided vehicle 1 transmits a status report (unloading task completion report) notifying that the unloading task has been completed, to the operation management computer 3 (S311). This also acts as an inquiry as to the next task.

The operation management computer 3 having received the status report notifying that the unloading task has been completed transmits a similar status report to the host computer 2.

The host computer 2 having received, via the operation management computer 3, the unloading task completion report transmits the next task instruction to the automatic guided vehicle 1 (S312).

Herein, it is assumed that movement (not performing a loading task or an unloading task) is instructed as the content of a task.

The automatic guided vehicle 1 having received the task instruction via the operation management computer 3 performs drive control, which will be described later with reference to FIG. 11 (S313), and reports the current status (information on address passing, information on task completion, etc.) to the operation management computer 3 (S314).

The automatic guided vehicle 1 repeats the process in step S313 and step S314 until the automatic guided vehicle 1 arrives at the target address.

Then, subsequent to the drive control (S315), when the automatic guided vehicle 1 has arrived at the target address, the automatic guided vehicle 1 transmits a status report notifying that it has arrived at the target address (movement task completion report), to the operation management computer 3 (S316). This also acts as an inquiry as to the next task.

The operation management computer 3 having received the status report notifying that the movement task has been completed transmits a similar status report to the host computer 2.

The host computer 2 having received, via the operation management computer 3, the movement task completion report confirms about the next task (S317).

Incidentally, although, in FIG. 10, the host computer 2 having received the report of completion of the loading task in step S306 immediately transmits an instruction for an unloading task, which is the next task, to the automatic guided vehicle 1, the host computer 2 may transmit the instruction for the next task to the automatic guided vehicle 1 after receiving an inquiry as to the next task from the automatic guided vehicle 1. This is also possible likewise in the case of an unloading task or a movement task.

Further, in FIG. 10, in a case that the automatic guided vehicle 1 has not yet arrived at the target address, arrangement may be made such that the automatic guided vehicle 1 does not perform status reporting.

Still further, when an abnormality has occurred on the automatic guided vehicle 1, the automatic guided vehicle 1 autonomously obtains the current position if the current address is input to the automatic guided vehicle 1, for example, via the touch panel 60 similarly to the case of setting the automatic guided vehicle 1 online.

Process for Drive Control

Figure 11:
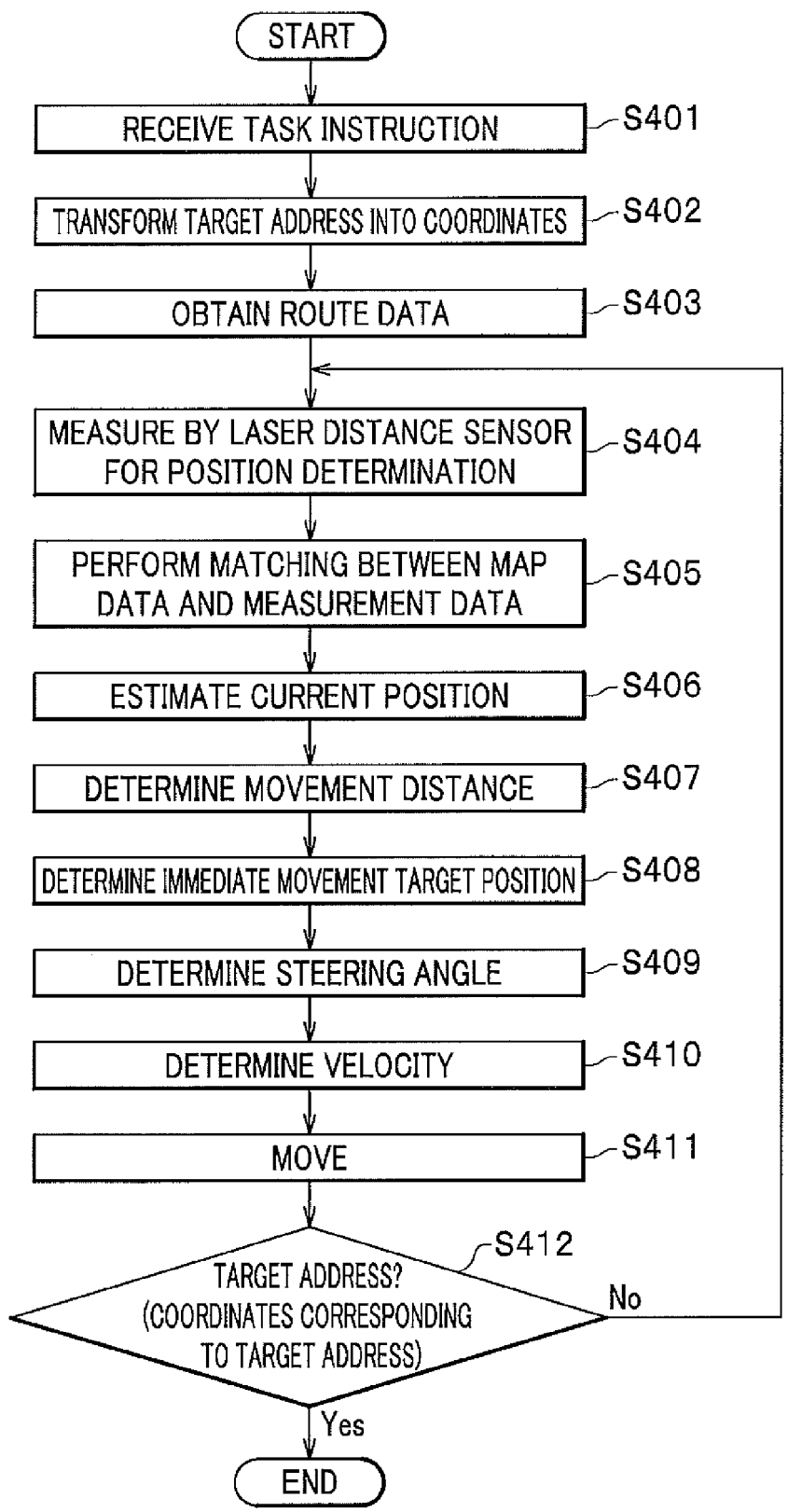
FIG. 11 is a flowchart showing a procedure of a process for drive control according to the first embodiment.

FIG. 11 is a flowchart showing the procedure of a process for drive control according to the first embodiment. The process in FIG. 11 corresponds to the details of the process in steps S303, S305, S308, S310, S313, and S315 in FIG. 10.

First, the automatic guided vehicle 1 receives a task instruction via the operation management computer 3 (S401).

Then, the coordinate transformation section 112 of the automatic guided vehicle 1 transforms the target address included in a task instruction into coordinates, according to the correspondence information between addresses and coordinates stored in the route data 123 (S402).

When the data obtaining section 113 of the automatic guided vehicle 1 selects a piece of the route data 123 going from the current address to the target address, from the route data 123 stored in the data memory 120, the data obtaining section 113 obtains the piece of route data 123 (S403).

Subsequently, measurement by a laser distance sensor is performed to determine a position, wherein the laser distance sensor 20 performs laser distance measurement, which has been described with reference to FIG. 4, and the measurement data obtaining section 114 obtains a result of the laser distance measurement (S404).

Then, the matching section 115 performs matching between the map data 122 stored in the data memory 120 and the measurement data 121 obtained in step S404 (S405), and the position estimating section 116 estimates the current position (X, Y) of the automatic guided vehicle 1, based on the matching result in step S405 (S406). The process in step S405 and step S406 is a technology described in Patent Document 4, and detailed description will be accordingly omitted. In brief, a part that agree with the shape of the measurement data 121 is searched on the map data 122, and the current position of the automatic guided vehicle 1 is estimated from a result of the searching. The estimated current position is obtained in a form of coordinates.

Then, the drive route determining section 117 determines the movement distance d and the actual movement distance da, based on velocity information v that is set in the route data 123 (S407). Computation of the actual movement distance da will be described later, referring to FIGS. 12 and 13.

Incidentally, in step S407, in a case that the automatic guided vehicle 1 is deviated from the route, the drive route determining section 117 uses velocity information that is set for the part, which is the closest from the automatic guided vehicle 1, of the route. In the first embodiment, a perpendicular line is extended from the reference point of the automatic guided vehicle 1 to the route, and velocity information that is set for the intersection point between the perpendicular line and the route is used. Incidentally, in the first embodiment, the center of the front face of the automatic guided vehicle 1 is defined to be the reference point of the automatic guided vehicle 1.

Arrangement is made such that the larger the movement distance is determined the larger the velocity that is set in the route data 123. For example, arrangement may be made such that the velocity and the movement distance have a proportional relationship, or such that the velocity and the movement distance have a relationship of a quadratic function or a higher-dimensional function.

An example of the relationship between a velocity and a movement distance d will be described below. In order that the automatic guided vehicle 1 does not arrive at the movement target, which is the end point of the movement distance d, by the time of the next distance sensor measurement, a sufficient length is applied.

first velocity: 5.0 mm/30 ms (0.6 km/h), movement distance d: 100 mm second velocity: 10.0 mm/30 ms (1.2 km/h), movement distance d: 200 mm third velocity: 20.0 mm/30 ms (2.4 km/h), movement distance d: 300 mm fourth velocity: 26.7 mm/30 ms (3.2 km/h), movement distance d: 400 mm Herein, a distance is taken for each 30 ms because the interval of measurement by the laser distance sensor 20 is set to 30 ms in this example. The value changes with the measurement interval.

Subsequently to step S407, the drive route determining section 117 determines the immediate movement target position by determining movement target coordinates to be the target on the route, based on the movement distance d obtained in step S407 and the current position coordinates (X, Y) (S408).

Then, the drive route determining section 117 determines the steering angle θ, based on the current coordinates (X, Y) and the movement target coordinates determined in step S408 (S409). The process in step S409 will be described later, referring to FIGS. 12 and 13.

Further, the drive route determining section 117 determines the velocity by again obtaining a velocity v that is set on the route from the route data 123, based on the current coordinates (X, Y) (S410).

At this moment, as the steering angle θ and the velocity v for moving the automatic guided vehicle 1 have been determined, the drive control section 118 transmits these parameters to the programmable controller 30 and thereby moves the automatic guided vehicle 1 toward the movement target that is the end point of the movement distance d (S411). Actually, the next measurement by the laser distance sensor 20 is performed at a timing earlier than the end of the movement time for the movement distance d.

At the time of the next measurement by the laser distance sensor (30 msec later), the stoppage control section 119 determines whether or not the automatic guided vehicle 1 has arrived at the target address (the coordinates corresponding to the target address) (S412). The process in step S412 will be described later, referring to FIGS. 14 to 16.

As a result of step S412, if the automatic guided vehicle 1 has not arrived at the target address (S412→No), the controller 10 returns the process to step S404.

As a result of step S412, if the automatic guided vehicle 1 has arrived at the target address (S412→Yes), the controller 10 terminates the process for drive control.

Incidentally, when the automatic guided vehicle 1 has arrived at the target address, the controller can hold the information on the current coordinates as it is in the data memory 120 to use the information at the time of the next task.

Determination of Steering Angle and Actual Movement Distance

A method for determining the steering angle and the actual movement distance will be described below, based on FIGS. 12 and 13 and referring to FIGS. 1 and 2. This is the process performed in steps S407 and S409 in FIG. 11.

Figure 12:
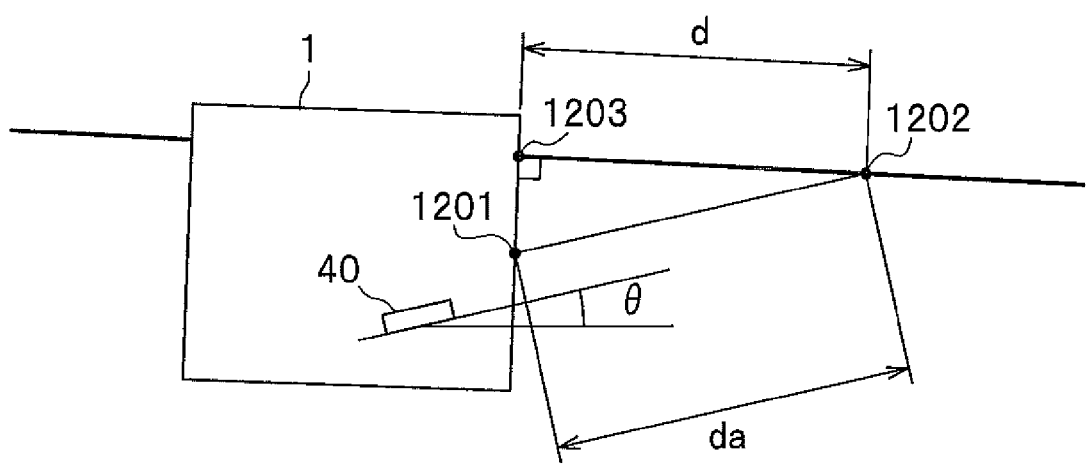
FIG. 12 is a diagram illustrating a method for determining a steering angle and an actual movement distance in a case that a route is linear.

FIG. 12 is a diagram that illustrates a method for determining the steering angle and the actual movement distance in a case that a route is a line as shown by the thick solid line.

In the present embodiment, the center of the front face of the automatic guided vehicle 1 is set as a reference point 1201 of the automatic guided vehicle 1. When the movement distance d is obtained based on the velocity, the drive route determining section 117 obtains the point that corresponds to the movement distance d from the root end 1203 of the perpendicular line extended from the reference point 1201 of the automatic guided vehicle 1 to the route, wherein the point is represented by movement target coordinates 1202. Then, the drive route determining section 117 sets the angle of the steered wheel 40 to the steering angle θ so as to move (direct) the automatic guided vehicle 1 toward the movement target coordinates 1202.

Herein, the actual movement distance da and the movement distance d have a relationship represented by da=d/cos θ.

Figure 13:
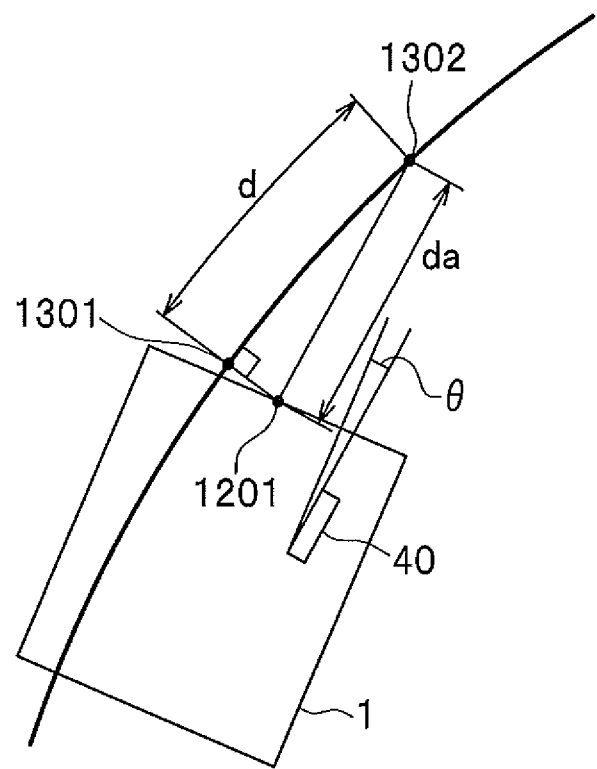
FIG. 13 is a diagram illustrating a method for determining a steering angle and an actual movement distance in a case that a route is curved.

FIG. 13 is a diagram that illustrates a method for determining the steering angle and the actual movement distance in a case that a route is a curve as shown by the solid curve.

Also in a case of a curved route, the drive route determining section 117 obtains the root end 1301 (the point that has the shortest distance on the route from the reference point 1201 of the automatic guided vehicle 1), on the route, of a line extending from the reference point 1201 of the automatic guided vehicle 1 and perpendicular to the route, computes the movement target coordinates 1302 with the length of the curve from the point 1301 as the movement distance d, and determines thereby the movement target coordinates 1302 on the route. In such a method, although the required amount of computation is large, it is possible to accurately obtain the movement target coordinates 1302 on a route even when the curvature of the route is large.

Incidentally, the actual movement distance da and the movement distance d have a relationship represented by da=d/cos θ.

According to the method illustrated in FIGS. 12 and 13, even when the current coordinates are not on the route, it is possible to determine the steering angle and the velocity so that the current coordinates come to be on the route at the next movement target coordinates.

As has been described above, in the present embodiment, as the velocity of the automatic guided vehicle 1 becomes larger corresponding to the drive velocity, the movement distance is set larger and the movement target coordinates as the target on the route are set farther. Accordingly, the automatic guided vehicle 1 can be controlled such as to stably run with small fluctuation.

Determination of Stoppage

A method for determining the steering angle and the actual movement distance will be described below, based on FIGS. 14 to 16 and referring to FIGS. 1 and 2. This is the process performed in step S412 in FIG. 11.

Figure 14:
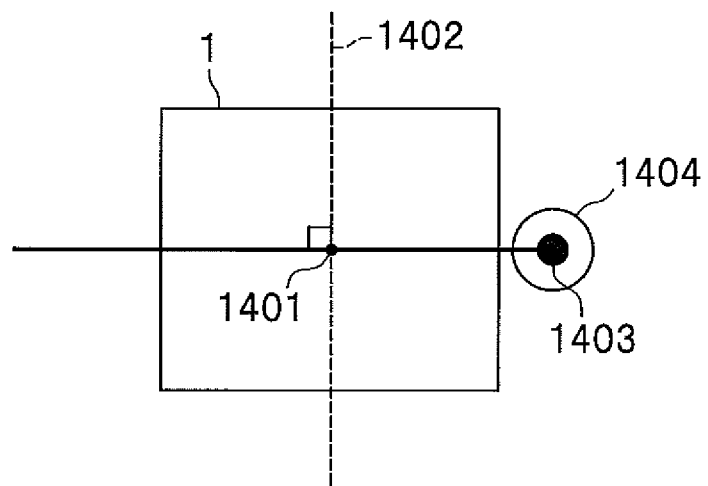
FIG. 14 is a diagram showing, as a comparison example, a method for determining stoppage of an automatic guided vehicle having been conventionally practiced.

As a comparison example, FIG. 14 shows a method, which has been conventionally practiced, for determining the stoppage of an automatic guided vehicle.

As shown in FIG. 14, in the comparison example, a traverse line 1402 is set perpendicular to the vehicle direction from the center point 1401 of an automatic guided vehicle 1, and the time when this traverse line has entered the stoppage range 1404 of a target address 1403 having been set on the drive route is defined to be the determination reference for stoppage.

Figure 15:
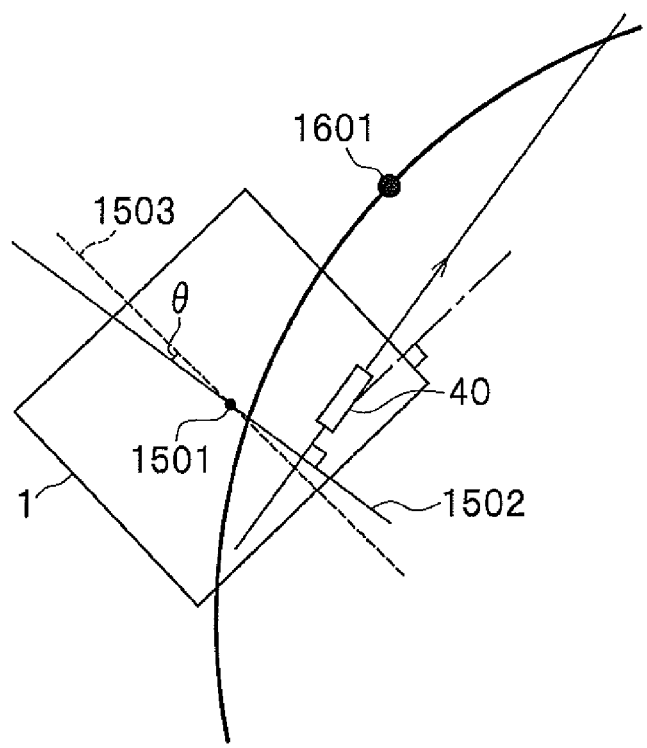
FIG. 15 is a diagram showing a method for determining stoppage of an automatic guided vehicle according to the first embodiment (during driving)
Figure 16:
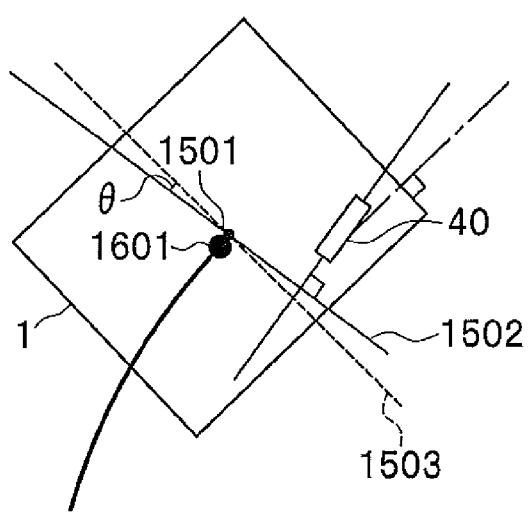
FIG. 16 is a diagram showing a method for determining stoppage of an automatic guided vehicle according to the first embodiment (at the time of stopping)

FIGS. 15 and 16 are diagrams showing a method for determining the stoppage, according to the first embodiment. As shown in FIG. 15, when the automatic guided vehicle 1 is deviated from a route, in other words, when the moving direction of the automatic guided vehicle 1 has a steering angle θ in moving toward the movement target coordinates 1202 in FIG. 12 or the movement target coordinates 1302 in FIG. 13, a stoppage determining section defines a target stoppage line 1502 such that the target stoppage line 1502 goes through the center point 1501 of the automatic guided vehicle 1 and is perpendicular to the direction (moving direction) of the steered wheel 40. This target stoppage line 1502 has the angle θ (steering angle) with respect to the traverse line 1503 described above with reference to FIG. 14. Incidentally, a reference symbol 1601 represents the coordinates corresponding to the target address.

FIG. 16 is a diagram showing a stoppage state of the automatic guided vehicle 1 in a case of using the method for determining the stoppage in the first embodiment.

As shown in FIG. 16, when the target stoppage line 1502 described above with reference to FIG. 15 has come to the coordinates 1601 corresponding to the target address or has come farther than the coordinates 1601 corresponding to the target address, the stoppage determining section determines that the automatic guided vehicle 1 has arrived at the target address (S412→Yes in FIG. 11). As the automatic guided vehicle 1 is controlled to run on the route, the automatic guided vehicle 1 moves such that the coordinates 1601 corresponding to the target address and the center point 1501 finally agree with each other in a tolerable error range with an image of being in the stoppage range 1404 in FIG. 14. However, by using the target stoppage line 1502 for the determination of stoppage, it is possible to stop the automatic guided vehicle 1 with a small deviation between the center point 1501 of the automatic guided vehicle 1 and the coordinates 1601 corresponding to the target address at the time of stoppage even in a state that the steering angle θ is not zero degree, in other words, the automatic guided vehicle 1 is deviated from the route.

Conclusion of First Embodiment

According to the first embodiment, as a target address is managed with coordinates, while enabling address designation that has been performed by drive control with hardware, such as an electric cable or a reflecting tape, it is possible to make the automatic guided vehicle 1 autonomously run without using an electric cable, a reflecting tape, or the like.

Further, by computing a steering angle θ and controlling the steered wheel 40 with the steering angle θ, even when the automatic guided vehicle 1 is deviated from a route, the automatic guided vehicle 1 can return to a route.

Further, by computing a target stoppage line 1502 and applying it, the deviation at the time of arrival at a target address can be decreased.

Second Embodiment

Figure 17:
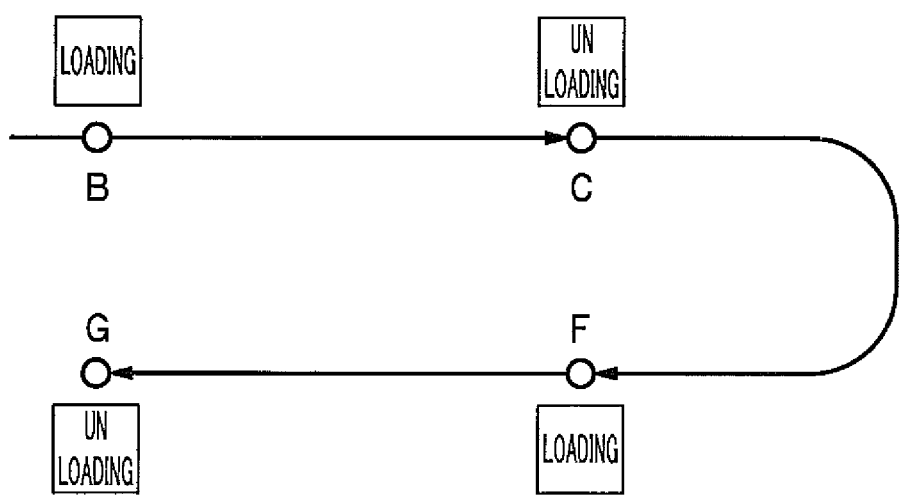
FIG. 17 is a diagram showing an example of route data according to a second embodiment.

FIG. 17 is a diagram showing an example of route data according to a second embodiment of the present invention.

As shown in FIG. 17, it is also possible to create a route 'B→G' by a combination of routes 'B→C', 'C→F', and 'F→G'.

Process for Drive Control

Figure 18:
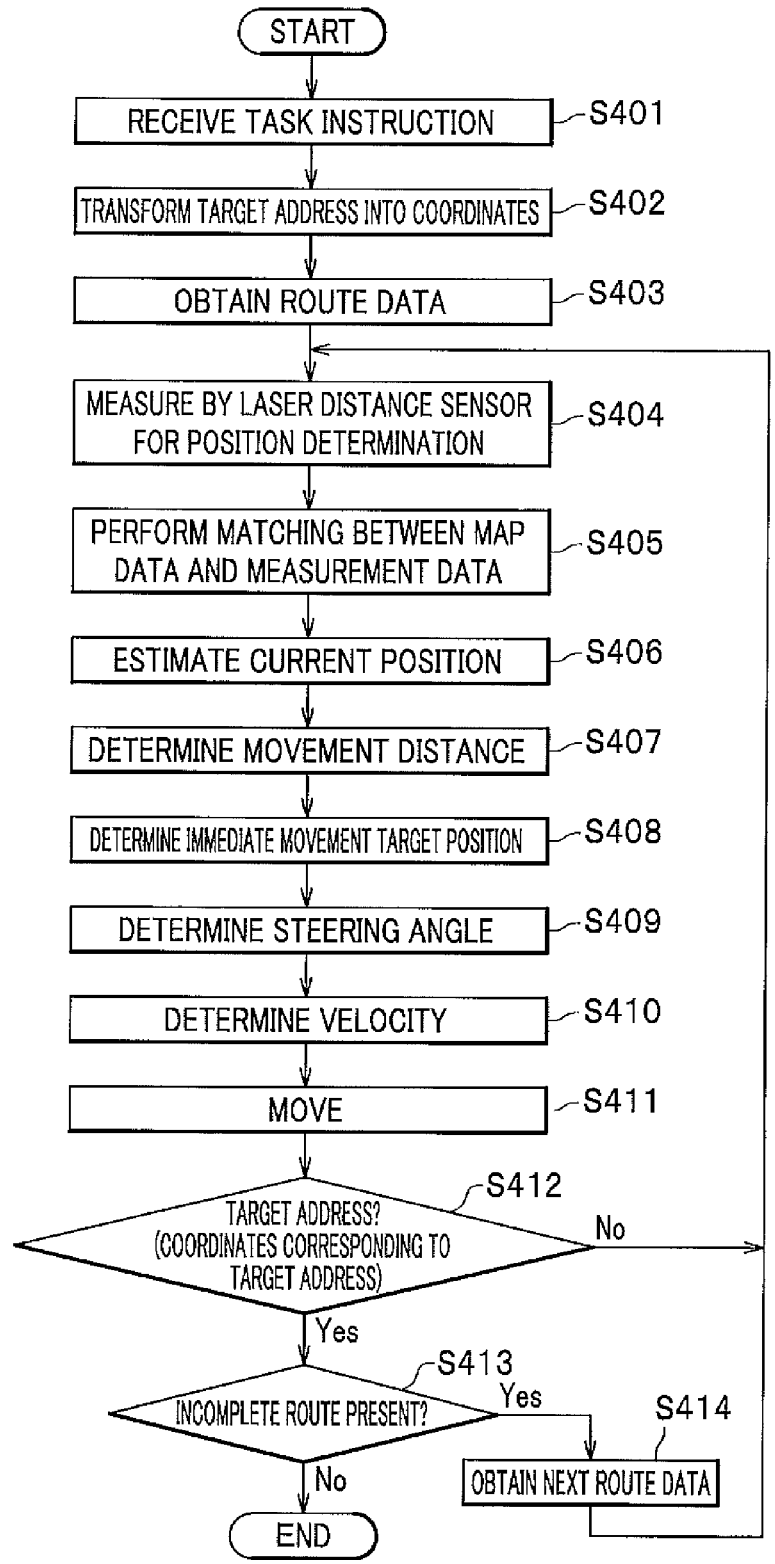
FIG. 18 is a flowchart showing a procedure of a process for drive control according to the second embodiment.

FIG. 18 is a flowchart showing a procedure of a process for drive control according to a second embodiment. The process in FIG. 18 corresponds to the process for drive control in steps S303, S305, S308, S310, S313, and S315.

In FIG. 18, the process from step S401 to step S412 is similar to that in FIG. 11, and description will be omitted. Incidentally, in obtaining routes in step S403 in the present embodiment, a plurality of routes are obtained in the order of processing. For example, in the example shown in FIG. 17, the route data 123 of 'B→C', the route data 123 of 'C→F', and the route data 123 of 'F→G' are input to the controller 10 in this order, and the controller 10 processes these route data 123 in the order of this input.

As a result of step S412, if the automatic guided vehicle 1 has arrived at the coordinates corresponding to a target address (S412→Yes), the data obtaining section 113 determines whether or not there is an incomplete route (S413).

As a result of step S413, if there is an incomplete route (S413→Yes), the data obtaining section 113 obtains the next route data 123 (S414), and the process is returned to step S404.

As a result of step S413, if there is no incomplete route (S413→No), the controller 10 terminates the process for drive control.

Herein, describing the process in step S413 in detail, as shown in FIG. 17, it is possible to create a route 'B→G' by a combination of routes 'B→C', 'C→F', and 'F→G'. In this case, the controller 10 first performs the process in steps S404 to S412 on the route data 123 of 'B→C'. As the route data 123 of 'C→F' and 'F→G' are left as incomplete routes, the data obtaining section 113 determines 'Yes' in step S413, and the route data 123 of 'C→F' is obtained as the next route data 123 in step S414.

Then, the controller 10 performs the process in steps S404 to S412 on the route data 123 of 'C→F'. As the route data 123 of 'F→G' is left as an incomplete route, the data obtaining section 113 determines 'Yes' in step S413, and the route data 123 of 'F→G' is obtained as the next route data 123 in step S414.

Then, the controller 10 performs the process in steps S404 to S412 on the route data 123 of 'F→G'. Then, as there is no incomplete route in step S413, the data obtaining section 113 determines 'No' in step S413, and the controller 10 terminates the process for drive control.

Conclusion of Second Embodiment

In such a manner, as it is unnecessary to create all possible route data 123 in advance unlike the first embodiment, the work load of a user can be greatly relieved in a case that a complicated route is included or other cases.

According to the present invention, an automatic guided vehicle and a method for drive control that enable driving based on a coordinate system while using designation of a movement target position by an address.

What is claimed is:

1. An automatic guided vehicle configured to drive automatically in a drive area, the automatic guided vehicle comprising:
a sensor configured to measure a distance to an object;
a storage section configured to store correspondence information between addresses of certain positions in the drive area and coordinates in map data of the drive area; and
a control section configured, when a target address that is used to designate a target position is designated by an external device:
to transform the designated target address into coordinates, based on the correspondence information between the addresses and the coordinates,
to compute a steering angle,
to control the steered wheel of the vehicle by using the steering angle, even when the automatic guided vehicle deviates from a route, thereby enabling the automatic guided vehicle to return to the route,
to set a target stoppage line configured to go through a center point of the automatic guided vehicle and be perpendicular to a moving direction,
to determine that the automatic guided vehicle has arrived at the target address when the target address is on the target stoppage line, or when the target stoppage line has come farther than the target address, within a predetermined deviation, at the time of stoppage, between the center point of the automatic guided vehicle and the coordinates corresponding to the target address, even when the steering angle is not zero degree, and
to drive the automatic guided vehicle to the coordinates corresponding to the target address, following preset route data;

wherein the map data includes data on a position of an obstacle in the drive area, the position of the obstacle measured by the automatic guide vehicle with the sensor before driving automatically in the drive area, the automatic guided vehicle driving in the drive area by receiving and following an external drive signal;

wherein the map data and the route data is made with use of the external device and stored in the storage section before the automatic guided vehicle drives automatically in the drive area; and wherein the automatic guided vehicle is configured, when driving automatically in the drive area, to obtain a current position thereof as a reference position for driving by matching the map data and the measurement data on the position of the obstacle in relation to the automatic guided vehicle, the position of the obstacle measured with the sensor, and to drive to the target address, following the route data, based on the current position.

2. The automatic guided vehicle according to claim 1,
wherein, when the automatic guided vehicle has arrived at the target address and completed a task instructed from the external device, the control section transmits, to the external device, information notifying the completion of the task, and the target address where the automatic guided vehicle is present.

3. The automatic guided vehicle according to claim 1,
wherein, when the automatic guided vehicle has arrived at the target address, the control section holds the target address and the coordinates corresponding to the target address, in the storage section.

4. The automatic guided vehicle according to claim 1,
wherein a plurality of the route data are combined to form a single route data.

5. A method for drive control by an automatic guided vehicle configured to drive automatically in a drive area, the method for drive control comprising:

measuring, before driving the automatic guided vehicle automatically in the drive area, a position of an obstacle in the drive area with a sensor configured to measure a distance to an object while the automatic guided vehicle drives in the drive area by receiving and following an external drive signal, and making map data of the drive area and route data with use of an external device, the map data including data on the position of the obstacle measured, the map data and the route data being stored in a storage of the automatic guided vehicle;

obtaining, when driving the automatic guided vehicle automatically in the drive area, a current position of the automatic guided vehicle as a reference position for driving by matching the map data and measurement data on the position of the obstacle in relation to the automatic guided vehicle, the position of the obstacle measured with the sensor;

transforming, by using the controller, based on a correspondence information between the addresses of certain positions in the drive area and coordinates set in the map data of the drive area, the correspondence information stored in the storage of the automatic guided vehicle, a target address into coordinates, the target address is used to designate a target position, when the target address is designated by an external device;

computing a steering angle;

controlling the steered wheel of the vehicle by using the steering angle, even when the automatic guided vehicle deviates from a route, thereby enabling the automatic guided vehicle to return to the route;

setting a target stoppage line configured to go through a center point of the automatic guided vehicle and be perpendicular to a moving direction, by using the controller;

determining that the automatic guided vehicle has arrived at the target address when the target address is on the target stoppage line, or when the target stoppage line has come farther than the target address, within a predetermined deviation, at the time of stoppage, between the center point of the automatic guided vehicle and the coordinates corresponding to the target address, even when the steering angle is not zero degree, by using the controller; and driving the automatic guided vehicle, by using the controller, to the coordinates corresponding to the target address, by following the route data, based on the current position.

6. An automatic guided vehicle configured to drive automatically in a drive area, the automatic guided vehicle comprising:

a sensor configured to measure a distance to an object;

a storage section configured to store correspondence information between addresses of certain positions in the drive area and coordinates that are set in the map data of the drive area; and a control section configured:
to obtain, when driving automatically the automatic guided vehicle in the drive area, a current position of the automatic guided vehicle as a reference position for driving by matching the map data and measurement data on the position of the obstacle in relation to the automatic guided vehicle, the position of the obstacle measured with the sensor, to transform a target address that is used to designate a target position into coordinates, based on the correspondence information between the addresses and the coordinates, when the target address is designated by an external device, to compute a steering angle, to control the steered wheel of the vehicle by using the steering angle, even when the automatic guided vehicle deviates from a route, thereby enabling the automatic guided vehicle to return to the route, to set a target stoppage line, configured to go through a center point of the automatic guided vehicle, and be perpendicular to a moving direction, to determine that the automatic guided vehicle has arrived at the target address, when the target address is on the target stoppage line, or when the target stoppage line has come farther than the target address, within a predetermined deviation, at the time of stoppage, between the center point of the automatic guided vehicle and the coordinates corresponding to the target address, even when the steering angle is not zero degree, and to drive the automatic guided vehicle to the coordinates corresponding to the target address, following preset route data, based on the current position;

wherein before driving automatically in the drive area, the automatic guided vehicle drives in the drive area by receiving and following an external drive signal and measures a position of an obstacle in the drive area with the sensor, and makes the map data of the drive area and the route data with use of the external device, the map data including data on the position of the obstacle measured, the map data and the route data being stored in the storage section.

7. The automatic guided vehicle according to claim 6, wherein the control section is configured to transmit, to the external device, information notifying the completion of the task, and the target address where the automatic guided vehicle is present, when the automatic guided vehicle has arrived at the target address and completed a task instructed from the external device.

8. The automatic guided vehicle according to claim 6, wherein the control section is configured to hold the target address, and the coordinates corresponding to the target address, in the storage section, when the automatic guided vehicle has arrived at the target address.

9. The automatic guided vehicle according to claim 6, wherein the control section is configured to combine a plurality of the route data in order to form a single route data.

10. The automatic guided vehicle according to claim 6, wherein the addresses of certain positions in the drive area are obtained from another system.

\* \* \* \* \*